United States Patent
Smith et al.

(10) Patent No.: US 12,182,178 B1
(45) Date of Patent: Dec. 31, 2024

(54) SYSTEM AND METHODS FOR VARYING OPTIMIZATION SOLUTIONS USING CONSTRAINTS BASED ON AN ENDPOINT

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/612,783

(22) Filed: Mar. 21, 2024

(51) Int. Cl.
  *G06F 16/28*   (2019.01)
  *G06F 16/242*  (2019.01)
  *G06F 40/30*   (2020.01)

(52) U.S. Cl.
  CPC ........ *G06F 16/285* (2019.01); *G06F 16/2428* (2019.01); *G06F 40/30* (2020.01)

(58) Field of Classification Search
  CPC ........ G06N 20/00; G06N 20/10; G06N 20/20; G06N 3/045; G06N 3/08; G06N 7/01; G06F 16/285; G06F 16/3329; G06F 16/3347; G06F 16/338; G06F 16/35; G06F 16/9024; G06F 16/906; G06F 40/30; G06F 18/23; G06F 18/24; G06F 16/90; G06F 11/3438; G06Q 40/02; G06Q 40/06; G06Q 10/0633; G06Q 10/0637; G06Q 10/06393; G06Q 10/10; G06Q 20/4016; G06Q 30/0247
  See application file for complete search history.

(56) References Cited

U.S. PATENT DOCUMENTS 10,937,089 B2  3/2021  Nandan et al.
11,017,474 B1  5/2021  Guerrero et al.
(Continued)

OTHER PUBLICATIONS

Al Dhaheri, Machine Learning for Financial Planning: A Comparative Analysis of Traditional Approaches and New Technologies. Oct. 2023. International Journal of Innovative Science and Research Technology, vol. 8, Iss. 10. Retrieved at https://ijisrt.com/assets/upload/files/IJISRT23OCT1563.pdf.
(Continued)

*Primary Examiner* — Robert W Beausoliel, Jr.
*Assistant Examiner* — Cheryl M Shechtman
(74) *Attorney, Agent, or Firm* — Caldwell Intellectual Property Law

(57) ABSTRACT

A system for varying optimization solutions using constraints based on an endpoint, the system including at least a processor, a memory communicatively connected to the at least a processor, the memory containing instructions configuring the processor to receive process data including a plurality of impediments, generate an endpoint using a module configured to, analyze the plurality of impediments by extracting a feature from each impediment of the plurality of impediments, classify a plurality of impediments using the extracted features to a plurality of identifiers, rank the plurality of identifiers based on severity score, output the endpoint based on an identifier severity score, identify a plurality of nodes, receive at least a constraint, locate in the plurality of nodes an outlier cluster based on the endpoint, determine an outlier process as a function of the outlier cluster, and determine a visual element data structure as a function of the outlier process.

18 Claims, 10 Drawing Sheets

(56) References Cited

U.S. PATENT DOCUMENTS

| | | | |
|---|---|---|---|
| 11,062,265 B1 | 7/2021 | Sanidas | |
| 11,443,380 B2 | 9/2022 | Cummings | |
| 11,513,772 B1 * | 11/2022 | Gross | H04L 67/10 |
| 11,556,737 B2 * | 1/2023 | Austin | G06V 10/96 |
| 11,615,352 B2 | 3/2023 | Carney et al. | |
| 11,868,859 B1 * | 1/2024 | Smith | G06N 20/00 |
| 2020/0234373 A1 | 7/2020 | Graver | |
| 2021/0256396 A1 * | 8/2021 | Meier | G06N 5/025 |
| 2023/0075411 A1 | 3/2023 | Jeph et al. | |
| 2023/0132064 A1 * | 4/2023 | Zhang | G06N 3/0985 |
| | | | 706/12 |
| 2023/0135162 A1 | 5/2023 | Cohen et al. | |

OTHER PUBLICATIONS

Pagliaro et al. Investor behavior modeling by analyzing financial advisor notes: a machine learning perspective. Nov. 2021. Proceedings of the Second ACM International Conference on AI in Finance, pp. 1-8. Retrieved at https://arxiv.org/pdf/2107.05592.

Abu Kassim et al. Student's financial asisstant. 2023. International Teaching Aid Competition (iTAC) 2023: 649-655. https://ir.uitm.edu.my/id/eprint/83940/1/83940.pdf.

* cited by examiner

SYSTEM AND METHODS FOR VARYING OPTIMIZATION SOLUTIONS USING CONSTRAINTS BASED ON AN ENDPOINT

FIELD OF THE INVENTION

The present invention generally relates to the field of machine learning. In particular, the present invention is directed to systems and methods for varying optimization solutions using constraints based on an endpoint.

BACKGROUND

Optimization techniques typically produce expected results; however, in specific scenarios, these outcomes may lack robustness and overlook potential collisions arising from similar optimization paths. Before generating these paths, it is crucial to identify overarching problems to focus the generation of unique and viable solutions on.

SUMMARY OF THE DISCLOSURE

In an aspect, a system for varying optimization solutions using constraints based on an endpoint, the system including at least a processor, a memory communicatively connected to the at least a processor, the memory containing instructions configuring the processor to receive process data including a plurality of impediments, generate an endpoint using a module configured to, analyze the plurality of impediments by extracting a feature from each impediment of the plurality of impediments, classify a plurality of impediments using the extracted features to a plurality of identifiers, rank the plurality of identifiers based on severity score, output the endpoint based on an identifier severity score, identify a plurality of nodes, receive at least a constraint, locate in the plurality of nodes an outlier cluster based on the endpoint, determine an outlier process as a function of the outlier cluster, and determine a visual element data structure as a function of the outlier process.

In another aspect, a method for varying optimization solutions using constraints based on an endpoint, the method including using a computing device configured to receive process data including a plurality of impediments, generate an endpoint using a module configured to, analyze the plurality of impediments by extracting a feature from each impediment of the plurality of impediments, classify a plurality of impediments using the extracted features to a plurality of identifiers, rank the plurality of identifiers based on severity score, output the endpoint based on an identifier severity score, identify a plurality of nodes, receive at least a constraint, locate in the plurality of nodes an outlier cluster based on the endpoint, determine an outlier process as a function of the outlier cluster, and determine a visual element data structure as a function of the outlier process.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for varying optimization solutions using constraints based on an endpoint. In an aspect, a system may be used to determine and endpoint, such as a task that is hindering a user or organization from reaching a goal. The system may generate a plurality of paths/solutions based on the endpoint. Aspects of the present disclosure can be used to display input fields to a user using a Graphical User Interface (GUI) defined as a point of interaction between the user and a remote display device.

Aspects of the present disclosure can be used to display input fields to a user using a Graphical User Interface (GUI) defined as a point of interaction between the user and a remote display device. Aspects of the present disclosure can also be used to generate at least an action item as a function of the achievement plan. Exemplary embodiments illustrating aspects of the present disclosure are described below in the context of several specific examples.

Figure 1:
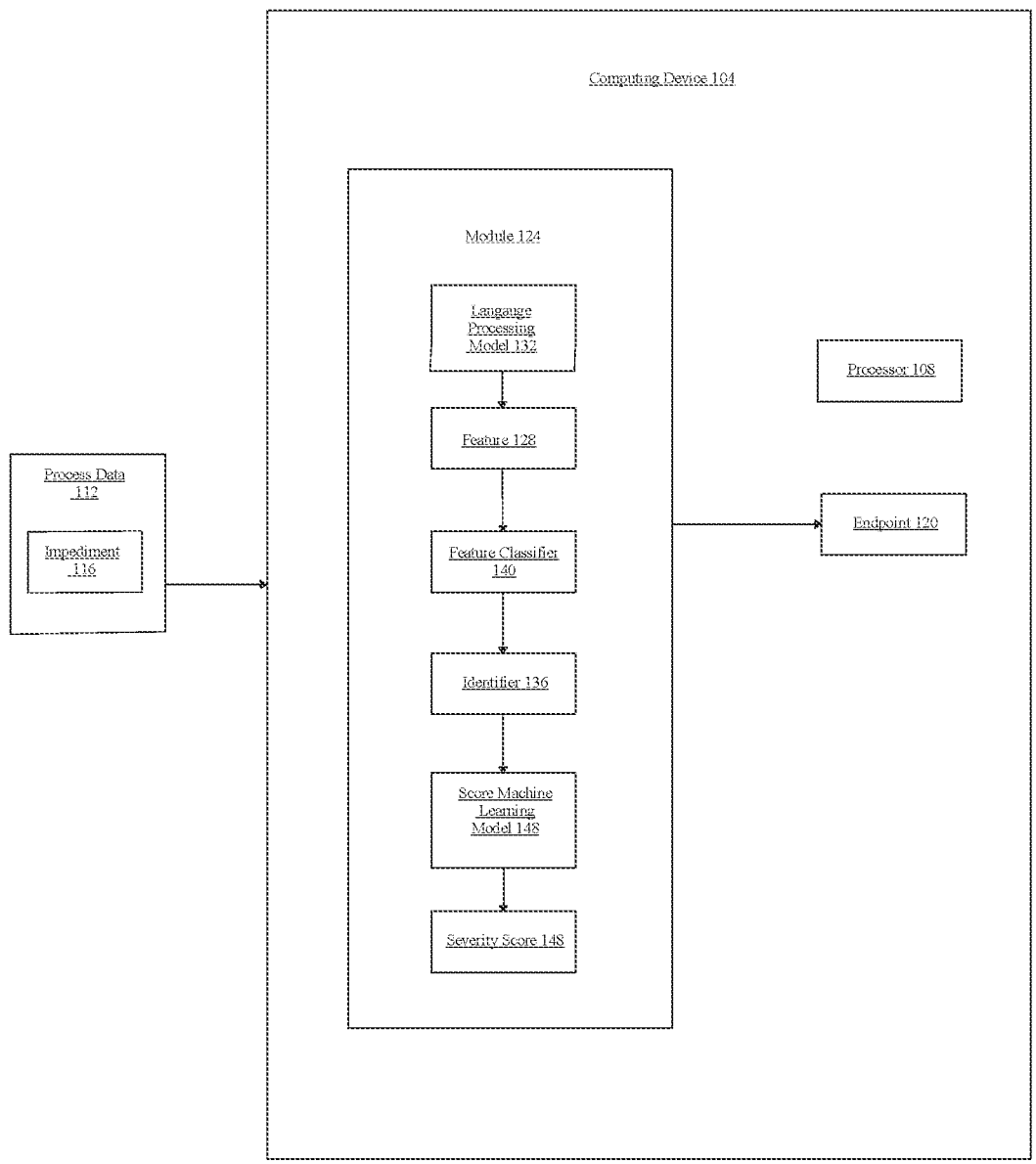
FIG. 1 is a block diagram of an embodiment of a system for generating an endpoint.

Referring now to FIG. 1, an exemplary embodiment of a system 100 for generating an endpoint is illustrated. System includes a computing device 104. Computing device 104 includes at least a processor 108 communicatively connected to a memory. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing devices 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to receive process data 112 comprising a plurality of impediments 116. "Process data," as used herein is user information related to pending activities of one or more user. A user may refer to a person such a team member of an organization. Process data 112 may include information describing the goals, work schedule, and the like of an individual, team, or organization. For example, process data 112 may include an organization goal to hit a billing quota. "Impediments," as used herein, is data related to a problem of one or more users. A problem may refer to a task that needs to be completed, a situation that presents difficulty, uncertainty, or complexity and requires a solution or resolution, and the like. Problems can range from simple, routine issues to more intricate and multifaceted challenges that demand thoughtful analysis and decision-making. Problems may arise in different domains, including everyday life, academia, business, science, and technology. Impediments 116 may include tasks that need to be accomplished to reach a goal. Impediments 116 may include problems that need to be resolved in order to reach a goal. Process data 112 may include a plurality of impediments 116 of a plurality of users correlated to each other. For example, in a team of five users, each user may have a specific task or problem that needs to be addressed that effects the performance of another user or the overall performance of the team. Process data 112 may be received as through a user interface using methods as described further below, for example a chatbot may be programmed to receive impediments 116.

Still referring to FIG. 1, computing device 104 is configured to generate an endpoint 120 using a module 124. An "endpoint," as used herein, is an overarching task or problem that needs to be addressed that impediments stem from. For example, where a plurality of impediments 116 relate around teaching a plurality of new employees how to draft a email, an endpoint 120 may be creating an email template for new employees to use. A "module," as used herein, is a group of two or more components working consecutively to reach an output. The invention is disclosed with the understanding that the inclusion of a specific module is not essential. Instead, the invention comprises a grouping of components that collectively perform the desired functions. The absence of the mentioned module does not diminish the efficacy or functionality of the overall invention, as disclosed components of module 124 may function separately within system 100. A module 124 may include machine-learning models, language processing models 132, and the like as described throughout this disclosure.

Still referring to FIG. 1, module 124 is configured to analyze the plurality of impediments 116 by extracting a feature 128 from each impediment 116 of the plurality of impediments 116. A "feature," as used herein, is a particular characteristic of an impediment. For example, an impediment 116 may relate to a task for generating a excel spreadsheet summarizing business expenses over several months. Feature 128 may be generating the excel spreadsheet. Module 124 may include a language processing model 132 configured to analyze impediments 116 to extract one or more features based/trained on a plurality of keywords.

Still referring to FIG. 1, a language processing model 132 may include a program automatically generated by computing device 104 and to produce associations between one or more words extracted from at least a document or string of text and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like. Generating the language processing model 132 may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, computing device 104 may train a language processing model 132 to identify keywords in a plurality of impediments 116 by iteratively generating training datasets indicating exemplary keywords of impediments 116. In other words, a language processing model 132 training dataset may include a plurality of features and keywords correlated to plurality of impediments 116. For example, a training data set may be labeled for computer based tasks wherein a plurality of keywords, such as generate, power point, draft email, and the like may be correlated to a plurality of impediments 116. The language processing model 132 and/or computing device 104 may be configured to preprocess impediments 116 by tokenization (breaking text into words or phrases), removing stop words (common words with little meaning), and stemming or lemmatization (reducing words to their root forms). For example, preprocessing impediments 116 may include eliminating non-alphanumeric characters, punctuation, and symbols that might not contribute significantly to keyword identification. Preprocessing may include sanitizing, feature 128 selection, feature 128 scaling, data augmentation and the like. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

Still referring to FIG. 1, module 124 and or language processing model 132 may include a machine-learning model, such as a classifier, configured to classify one or more keywords based on one impediment 116 to feature 128. A keyword classifier may be trained with datasets including a plurality of keywords correlated to plurality of features. In some embodiments, processor may look up identified keywords in a data source such as a database or look up table. For example, processor may access a lookup table including keywords, wherein each keyword is associated with one or more features.

Still referring to FIG. 1, module 124 is configured to classify a plurality of impediments 116 using the extracted features to a plurality of identifiers 136. Module 124 may include a machine learning model, such as a classifier as defined further below, configured to classify a plurality of impediments 116 using the extracted features to a plurality of identifiers 136. A feature classifier 140 may be configured to receive the plurality of extracted features as an input and output a plurality of identifiers 136. An "identifier," as used herein, is a categorization of an impediment 116 based on a feature 128 to a standard problem. For example, impediment 116 may be training a plurality of users to perform a specific task, feature(s) may be keywords such as "train", "same task", "several employees," wherein identifier 136 may categorize training related impediments 116 to training related identifiers 136 such as, generating templates, optimizing onboarding process, and the like. The feature classifier 140 training datasets may include a plurality of features correlated to a plurality of identifiers 136.

Still referring to FIG. 1, module 124 is configured to rank the plurality of identifiers 136 based on severity score 144. A "severity score," as used herein, is value indicating the priority of addressing an identifier. Severity score 144 may include a numerical variable. These values can be discrete or continuous and are associated with a numeric scale. Severity score 144 may include a linguistic variable. Instead of numerical values, linguistic variables are associated with linguistic terms or labels. These terms capture qualitative information and are often expressed in natural language. Module 124 may include a scoring machine learning model 148 configured to receive the identifiers 136 as an input and perform a scoring function to output a plurality of severity scores 144. A scoring function may include linear regression, logistic regression, neural networks, and the like. The scoring machine learning model 148 may be trained with datasets including weights associated with a plurality of features and identifiers. For example. Scoring machine learning model 148 may include data correlating a plurality of identifiers 136 and features to a plurality of severity scores 144. After outputting the plurality of severity scores 144, module 124 may include a neural network architecture, model, and the like configured to perform a ranking function, wherein severity scores 144 may be ranked in numeral order. In embodiments, where severity scores 144 are linguistic variables, a model, such as a classifier, may be trained on datasets ordering the ranking of linguistic variables, to rank the polarity of severity scores 144.

Still referring to FIG. 1, models, networks, and like as described being part of module 124 may all include feedback loops for improving training and processing. A feedback loop refers to the iterative process of continuously improving and optimizing a model's performance based on feedback from its predictions, outcomes, or user submitted feedback. This loop involves collecting new data, evaluating the model's predictions, updating the model accordingly, and repeating the cycle. A feedback loop may include data collected from user labeling outputs as features, severity scores 144, and the like from poor to good. Computing device may remove or update training data sets correlated to the negative user feedback. Additionally, a feedback loop may include data gathered using a web crawler to update training data sets. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. For example, new categories of features to identifiers 136 may be iteratively gathered.

Still referring to FIG. 1, module 124 is configured to output endpoint 120 based on an identifier 136 severity score 144. Outputting endpoint 120 may include determining identifier 136 with the highest severity score 144 as endpoint 120. In this case, endpoint 120 may refer to the main problem or task, as determined apparatus 100, that the plurality of impediments 116 branch off from.

Still referring to FIG. 1, module 124 represents a technological improvement to the functioning of computing device 124 in generating an endpoint. For example, a machine-learning model, such as feature classifier 140, improves the performance of processor 108 by generating a plurality of identifiers 136, wherein each identifier 136 represent a categorization of impediment 116 to an overarching problem. Scoring machine learning model 148 then generates a plurality of severity scores 128 based on the identifiers 136 to determine endpoint 120 for computing device 104 to impellent in further processes as described below. The quantity of data that goes into generating endpoint 120 may vary and fluctuate based on a plurality of impediments 116, such as the quantity of impediments 116 related to plurality of goals. Without the implementation of machine-learning models, there would be a trade in the performance power of 108, such as time and accuracy, in order to sort the data and generate endpoint 120. The ability to continuously train a machine-learning model capable of learning to identify new trends or correlations within a fluctuating quantity of data is a benefit that would not be realized otherwise, without the tradeoff in performance efficiency. Furthermore, the use of module 124 helps resolve previous problems with issue spotting performed using computing device, as the disclosed machine-learning models are configured to not only to sort through the plurality of impediments 116 but determine the overarching problem, endpoint 120 based on the plurality of impediments 116.

Figure 2:
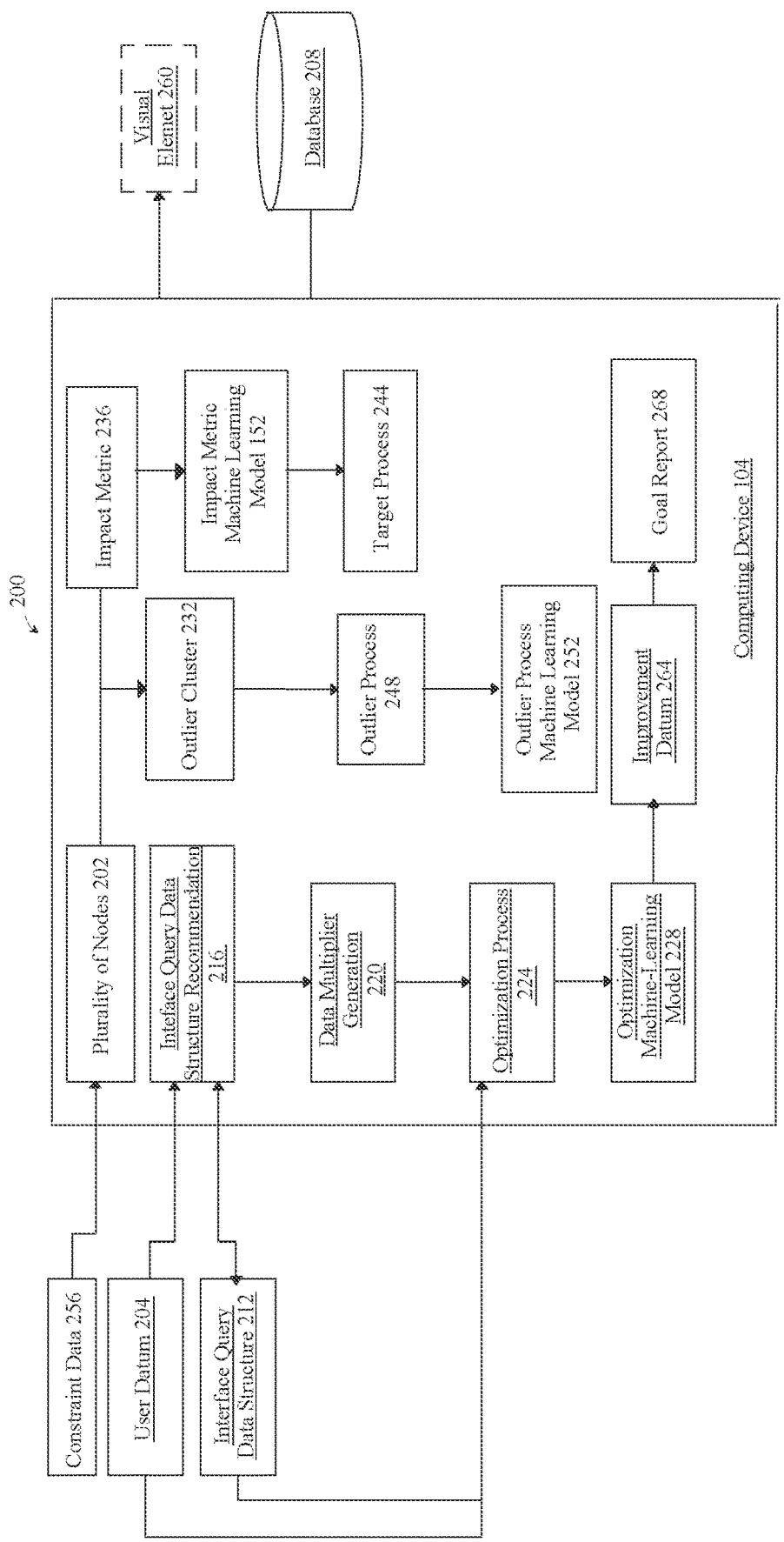
FIG. 2 is a block diagram of an embodiment of a system for varying optimization solutions using constraints based on an endpoint.

Referring now to FIG. 2, a diagram of system 200 for varying optimization solutions using constraints based on an endpoint is illustrated. System 200 includes system 100. Processor 108 may be configured to identify a plurality of nodes 202. As used herein, a "plurality of nodes" refers to a specific quantity of points or locations, typically more than two or three, that are part of a network or system. It signifies a group of nodes, often numerous and distributed, which can be interconnected or part of a larger structure. In an embodiment, nodes within the plurality of nodes may include user data, network data, software data, hardware data, and the like. The plurality of nodes 202 may operate on varying communication lines, pathways, and the like. In an embodiment, nodes identified within the plurality of nodes may be interconnected, related, or grouped together based on more narrowing similarities. A plurality of nodes may be identified using a node classifier. A node classifier may receive as inputs node data and a predetermined node list and may output a plurality of nodes. Node classifier may be trained on a dataset including historical node data associated with historical plurality of nodes. As a non-limiting example, node classifier may be trained on a dataset including, for each historical node in the dataset, historical node data associated with which market structures companies had an impact in; node classifier trained on such data may be capable of associating node data with varying constraints, where the constraints may include market analysis, market impact and the like. Node data may be processed before it is input into the node classifier, such as using optical character recognition, a language model, and/or data type conversions described throughout this disclosure.

With continued reference to FIG. 2, the plurality of nodes may comprise user data 204. For the purposes of this disclosure, "user data" refers to an element, datum, or elements of data describing historical data of a user, their company, associated market and the like. Examples of user data 204 may include attributes/facts that are about a user that are already known including, for example, personality traits, work history, market history, future market projections, a user's entrepreneurial lifestyle, market valuations, company evaluations, and the like. In some embodiments, user data 204 may comprise competitor data. As used herein, "competitor data" refers to information that is associated with market competitors, business competitors, and the like. Non-limiting examples of competitor data may include investments, trends in business dealings, market engagement, economic conditions, industry developments, and the like. In a non-limiting embodiment, a company evaluation may include an analysis or opinion from the user regarding specific companies, including their strategies, performance, potential, and the like. Competitor data may include competitor profiles such as information containing competitor's history, strategies, market position, financial health, operations, and the like. Competitor data may include competitor analysis reports such as insights into how competitors are performing in the market, their strengths, weaknesses, and strategies, and the like. Competitor data may include market share and position reports, such as data on competitors' share of the market, growth trajectories, and positioning in the industry, and the like. In some embodiments, user data 204 may be numerically quantified (e.g., by data describing discrete real integer values, such as 1, 2, 3 . . . n, where n=a user-defined or prior programmed maximum value entry, such as 10, where lower values denote relatively less significant achievements and higher values denote relatively more significant achievements). For example, in examples where described processes relate to gauging the impact of a competitor in a relevant market, user data 204 may equal "3" for a competitor only have minimum impact, a "6" for an intermediate impact, and an "8" for a high impact in the relevant market.

Alternatively, in other examples where described processes relate to a competitor's impact in a relevant market, user data 204 may equal a "3" for performing slightly beneath (e.g., 20%) an enumerated sales or other output performance target, a "6" for achieving exactly the enumerated sales or other output performance target, an "8" for performing slightly above (e.g., 20%) the enumerated sales or other output performance target, or a "10" for greatly exceeding (e.g., 60%+) the enumerated sales or other output performance target. Other example values are possible along with other exemplary attributes and facts about a user that are already known and may be tailored to a particular situation where performance improvement is sought. For example, in addition to the above-described scenarios relating to market or business output, user datum 108A may include performance history relating to intellectual property protection (e.g., patents), market valuations (e.g., future predicted valuations) and/or the like. In one or more alternative embodiments, user data 204 may be described by data organized in or represented by lattices, grids, vectors, etc. and may be adjusted or selected as necessary to accommodate particular user-defined circumstances or any other format or structure for use as a calculative value that a person skilled in the art would recognize as suitable upon review of the entirety of this disclosure.

With continued reference to FIG. 2, in one or more embodiments, user data 204 may be provided to or received by processor 108 using various means. In one or more embodiments, user data 204 may be provided to processor 108 by a user, such as a business owner, operating officer, finance officer, market analyst, person that is interested in increasing and/or improving their performance in a particular area or field over a defined duration, such as a quarter or six months. A user may manually input user data 204 into computing device using, for example, a graphic user interface (GUI) and/or an input device. For example, and without limitation, a user may use a peripheral input device to navigate the graphic user interface and provide user data 204 to computing device 104. Non-limiting exemplary input devices include keyboards, joy sticks, light pens, tracker balls, scanners, tablet, microphones, mouses, switches, buttons, sliders, touchscreens, and the like. In other embodiments, user data 204 may be provided to processor 108 by a database over a network from, for example, a network-based platform. User data 204 may be stored in a database and communicated to processor 108 upon a retrieval request form a user and/or from computing device 104. In other embodiments, user data 204 may be communicated from a third-party application, such as from a third-party application on a third-party server, using a network. For example, user data 204 may be downloaded from a hosting website for a particular area, such as a meeting group for trail runners, or for a planning group for mountaineering expeditions, or for performance improvement relating to increasing business throughput volume and profit margins for any type of business, ranging from smaller start-ups to larger organizations that are functioning enterprises. In one or more embodiments, processor 108 may extract user data 204 from an accumulation of information provided by a database. For instance, and without limitation, processor 108 may extract needed information from database 208 regarding improvement in a particular area sought-after by the user and avoid taking any information determined to be unnecessary. This may be performed by processor 108 using a machine-learning model, which is described in this disclosure further below. Receiving user data may include generating a survey including questions tailored to categories such as morale, momentum, motivation, multipliers, relevant markets, relevant competitors, and the like. For example relating to a relevant market category, questions may be tailored to the history of the relevant market to assess trends in a user's ability to generate new intellectual capital in that respective market. Relevant market category question may prompt users to specify where their services/goods are sold, used, etc.

With continued reference to FIG. 2, processor 108 may be configured to receive user data 204 as a function of an interaction between a user and a chatbot. For the purposes of this disclosure a "chatbot" is a computer program that simulates and processes human conversation. Chatbot may interact with a user in order to receive user data 204. In some cases, chatbot may simulate a human in order to receive user data 204 through a conversation that occurred with the user. As opposed to ordinarily typing in information, a chatbot may engage and stimulate a user such that a user may properly input information and not feel discouraged from doing so. In some cases, chatbot may ask a user a series of questions, wherein the series of questions are requests for data. The series of questions may mimic ordinary human interaction in order to engage a user into inputting data. Chatbot is described in further detail below. Chatbot may include a language processing module as described below. In some embodiments, chatbot may use a large language model to generate responses. A "large language model," for the purposes of this disclosure, is a language model that has been trained using a large dataset containing a variety of different types of data. Large language model may include GPT, GPT-2, GPT-2, GPT-4, Bard, and the like. Large language models may use a transformer architecture. Transformer architectures may use an attention mechanism in order to determine what words to attend to when generating an output.

Still referring to FIG. 2, in some embodiments, gathering user data and entity data may include using a web crawler. A web crawler may be configured to automatically search and collect information related to a user. In one embodiment, the web crawler may be configured to scrape user data from user related social media and networking platforms. The web crawler may be trained with information received from an entity through a digital interface. As a non-limiting example, user may input into a digital interface, social media platforms the entity has accounts on and would like to retrieve entity data from. A digital interface may include a graphical user interface (GUI), command line interface (CLI), menu-driven user interface, touch user interface, voice user interface (VUI), form-based user interface, and the like. Processor may receive entity data including information such as an entity's name, profile, platform handles, platforms associated with the entity, descriptions of activities undertaken by entity, descriptions of products or services offered by entity, descriptions of achievements of entity employees, profiles of entity employees, business partners associated with entity, and the like. In some embodiments, a web crawler may be configured to generate a web query. A web query may include search criteria. Search criteria may include entity account handles, employee account handles, web page addresses and the like received from the user. A web crawler function may be configured to search for and/or detect one or more data patterns. A "data pattern" as used in this disclosure is any repeating forms of information. A data pattern may include, but is not limited to, features, phrases, and the like as described further below in this disclosure. The web crawler may work in tandem with a machine-learning model, digital processing technique utilized by a processor, and the like as described in this disclosure. In some embodiments, a web crawler may be configured to determine the relevancy of a data pattern. Relevancy may be determined by a relevancy score. A relevancy score may be automatically generated by processor 104, received from a machine learning model, and/or received from the user. In some embodiments, a relevancy score may include a range of numerical values that may correspond to a relevancy strength of data received from a web crawler function. As a non-limiting example, a web crawler function may search the Internet for data related to entity employees. In some embodiments, computing device may determine a relevancy score of entity data retrieved by a web crawler.

With continued reference to FIG. 2, in one or more embodiments, database 208 may include inputted or calculated information and datum related to improvement in a particular area sought-after by the user. A datum history may be stored in a database 208. Datum history may include real-time and/or previous inputted interface query data structure 212 and user data 204. In one or more embodiments, database 208 may include real-time or previously determined record recommendations and/or previously provided interaction preparations. Processor 108 may be communicatively connected with database 208. For example, and without limitation, in some cases, database 208 may be local to computing device 104. In another example, and without limitation, database 208 may be remote to computing device 104 and communicative with computing device 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104 connects directly, dynamically, and non-hierarchically to as many other computing devices as possible. A "network topology" as used in this disclosure is an arrangement of elements of a communication network. Network may use an immutable sequential listing to securely store database 208. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

With continued reference to FIG. 2, database 208 may include keywords. As used in this disclosure, a "keyword" is an element of word or syntax used to identify and/or match elements to each other. For example, without limitation, a keyword may be "patent" in the instance that a user is looking to prepare for relevant patent portfolio search. In another non-limiting example, a keyword may be "market valuation" in an example where the user is seeking to research a relevant market's impact or future projections. Database 208 may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 2, at least a processor 108 may be configured to generate an interface query data structure 212. As used herein the process of "generating an interface query data structure" refers to the process of designing a systematic arrangement of data tailored to interact efficiently with a user interface. The user interface may include a command-line interface, graphical user interface (GUI), application programming interface, and the like. Interface query data structure may configure a remote display device to display the input field to the user. The input field may be a response field for a user to answer a question, survey, and the like. The interface query data structure may then configure the remote device to receive at least a user-input datum from the input field. As used herein, "at least a user-input datum" refers to information gathered from a user-inputted response. Examples may include user inputted competitors, views on competition, views on the current market, company valuations, work related goals, and the like. In an embodiment, processor 108 may generate interface query data structure 212 based on user-input datum responses to interface query data structure recommendation 216. Interface query data structure recommendation may include questions tailored to categories such as motivation, multipliers, competition, market analysis, and the like. As used herein, "interface query data structure datum" refers to an element, data, or elements of data based on user-inputted responses to interface query data structure recommendation 216. In a non-limiting embodiment, interface query data structure 212 may be numerically quantified (e.g., by data describing discrete real integer values, such as 1, 2, 3 . . . n, where n=a user-defined or prior programmed maximum value entry, such as 10, where lower values denote relatively less significant achievements and higher values denote relatively more significant achievements). Based on user-input datum 216, processor 108 may initially generate or define interface query data structure 212 as including the user's current industry, competition, or the likes level as identified. Processor 108 may update or refine interface query data structure recommendation 216 to request the user to identify if their market competition encompasses certain companies, industries, intellectual property concepts, or the like. Upon receiving an affirmative response from the user, processor 108 may then even further refine the interface query data structure recommendation 216 to continue to present more narrowed questioning or requests for more information pertaining to the user's competition, market valuations, company evaluations and the like. Upon receiving user-input datum to specific questions, processor 108 may iteratively refine interface query structure datum. In this way, interface query data structure 212 may be generated based on one or more of textual or visual responses (e.g., provided by user data and/or responses to interface query data structure recommendation 216) to each categorical question (e.g., of interface query data structure recommendation 216) provided by the user. In one or more embodiments, computing device may present interface query data structure recommendation 216 to a user, such as suggest an addition or deletion of a word, phrase, image, or part of an image (collectively referred to in this disclosure as an "object") from a previously prepared interface query data structure, or may automatedly execute record recommendation, such as an automated addition or deletion of an object from a previously prepared interface query data structure automatically generates an iteratively customizable interface query data structure by computing device 104. In addition, iterations may be either displayed or not displayed to the user and limited, such as by the user, based on a total overall refinement preference for interface query data structure 212. Interface query data structure recommendation 216 may be presented using, for example and without limitations, using a display of apparatus 100, as discussed further in this disclosure below. In this way, interface query data structure 112A may be generated based on one or more of textual or visual responses (e.g., provided by user datum 108A and/or responses to interface query data structure recommendation 204A) to each categorical question (e.g., of interface query data structure recommendation 204A) provided by the user. In one or more embodiments, computing device may present interface query data structure recommendation 216 to a user, such as suggest an addition or deletion of a word, phrase, image, or part of an image (collectively referred to in this disclosure as an "object") from a previously prepared interface query data structure, or may automatedly execute record recommendation, such as an automated addition or deletion of an object from a previously prepared interface query data structure automatically generates an iteratively customizable interface query data structure by computing device 104. In addition, iterations may be either displayed or not displayed to the user and limited, such as by the user, based on a total overall refinement preference for interface query data structure 212. Interface query data structure recommendation 216 may be presented using, for example and without limitations, using a display of apparatus 100, as discussed further in this disclosure below.

In one or more embodiments, interface query data structure recommendation 204 may include information from interface query data structure 112 and user datum 108 for iteratively revising interface query data structure recommendation 204 and strategy data generation 138. As a result, strategy data generation 138 may provide a one or more strategies responsive to user datum 108 and/or interface query data structure 112. In one or more embodiments, interface query data structure recommendation 204 may include a video component, audio components, text components, and combination thereof, and the like. As used in this disclosure, a "digital media interface query data structure" is an interface query data structure provided in digital media format (e.g., digital videos, digital photos, etc.) to, for example, receive verbal responses to a sequence of targeted questioning relating to a particular area or field in which the user is seeking to improve their performance, such as for a particular activity. In some cases, digital media interface query data structures may include content that is representative or communicative of an at least attribute of a subject, such as a user. As used in this disclosure, a "subject" is a person such as, for example an aspiring alpinist. Subject user may be represented by, for example, their video-recorded verbal responses or by digital photos. For example, in some cases, an image component of a digital media resume may include an image of a subject. As used in this disclosure, an "image component" may be a visual representation of information, such as a plurality of temporally sequential frames and/or pictures, related to video resume and target video resume. For example, image component may include animations, still imagery, recorded video, and the like. Attributes may include subject's skills, competencies, credentials, talents, and the like. In some cases, attributes may be explicitly conveyed within video-recorded responses to a video interface query data structure and/or user-uploaded digital photos. Alternatively, or additionally, in some cases, attributes may be conveyed implicitly within a video interface query data structure or video-recorded responses thereto. Video resume may include a digital video. Digital video may be compressed to optimize speed and/or cost of transmission of videos. Videos may be compressed according to a video compression coding format (i.e., codec). Exemplary video compression codecs include H.26x codecs, MPEG formats, VVC, SVT-AV1, and the like. In some cases, compression of a digital video may be lossy, in which some information may be lost during compression. Alternatively, or additionally, in some cases, compression of a digital video may be substantially lossless, where substantially no information is lost during compression.

In some cases, computing device 104 may include audio-visual speech recognition (AVSR) processes to recognize verbal content in a video interface query data structure. For example, computing device 104 may use image content to aid in recognition of audible verbal content such as viewing user move their lips to speak on video to process the audio content of video-recorded responses to a vide interface query data structure. AVSR may use image component to aid the overall translation of the audio verbal content of video resumes. In some embodiments, AVSR may include techniques employing image processing capabilities in lip reading to aid speech recognition processes. In some cases, AVSR may be used to decode (i.e., recognize) indeterministic phonemes. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficient (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content. For instance, audio vector and image vector may each be concatenated and used to predict speech made by a user, who is "on camera."

In some cases, computing device 104 may be configured to recognize at least a keyword as a function of visual verbal content. In some cases, recognizing at least keyword May include an optical character recognition (OCR). In some cases, computing device 104 may transcribe much or even substantially all verbal content from video-recorded responses to a video interface query data structure. Alternatively, computing device 104 may use OCR and/or intelligent character recognition (ICR) may recognize written text one glyph or character at a time, for instance by employing machine-learning processes. In some cases, intelligent word recognition (IWR) may recognize written text, one word at a time, for instance by employing machine-learning processes in a variety of user-uploaded digital content, including videos, photos, scans of documents with text and/or the like.

Still referring to FIG. 2, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a prior knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 2, in one or more embodiments, processor 108 may be configured to receive constraint data 266. As used herein, "constraint data" refers to specific information or parameters that limit or restrict the way something can be designed, developed, or operated. This data provides guidelines, boundaries, or limitations that must be adhered to during a project or process to ensure compliance with certain standards, regulations, or project requirements. Constraint data can include factors such as time limits, size restrictions, work schedules, deadline, user capabilities, user bandwidth, budget limits, technical specifications, legal regulations, market restrictions, intellectual property analyses, or any other conditions that define the boundaries within which a project or system must operate. In an embodiment, constraint data 266 may include user-input data. Constraint data may be entered by a user, which allows the user to specify their needs, constraints, budget, time limits and the like. Constraint data may be ranked based on relative importance. Constraint data may be categorized using data multipliers to multiply data describing the constraints indicated by the user based on their relative importance or relevance.

Still referring to FIG. 2, in one or more embodiments, computing device 104 may generate data multipliers 220 to multiply data describing constraint data, user-provided responses, user-input data, and the like to interface query data structure recommendation 216 to, for example, proportionately increase weight or consideration provided to areas or fields identified by the user as being of particular interest or significance. For example, should interface query data structure recommendation 216 be initially provided at a high-level relating to user bandwidth, organizational resources, intellectual property capital, market competition, and the like, such as requesting the user "to indicate what companies or industries have intellectual property similar to yours," the user may provide a variety of responses, the majority of which may focus on intellectual property with the balance on other specifications, such as patent portfolios, market influence, and/or the like. Data multiplier generation 220 may proportionately increase emphasis placed on intellectual property relative to the other industries based on, for example, a pre-set numerical multiplicative value (e.g., "1.8×"), meaning that an original response ratio of 60% responses relating to intellectual property with 10% to the other patent portfolios, respectively, may be altered by the multipliers to a final ratio of 90% emphasis placed on market influence, with an even 2% each across the remaining categories. As a result, processor 104 may thereby elect to retrieve additional digital media interface query data structure content from database 208 relating to intellectual property at a heightened emphasis (e.g., 90%) relative to the original 60%, given that earlier user input indicates a higher interest in that competitor. The described examples are for illustrative purposes only in that a person skilled in the art would recognize other calculative and/or multiplicative ratios or procedures as suitable upon review of the entirety of this disclosure. Next, a multiplier machine-learning module may perform data multiplier scoring between user responses to interface query data structure recommendation 216 to organize data multipliers generated in data multiplier generation into an ordered hierarchical list. In another non-limiting embodiment, multiplier machine learning model may comprise a classifier that is configured to correlate the user data and the at least a user-input data to data related to the goal. Returning to the example relating to a competitor's intellectual property portfolio, in one or more non-limiting embodiments, multipliers relating to the intellectual property portfolio (e.g., in increasing the relative emphasis placed on intellectual property portfolio relative to other categories) may be scored higher and placed at a top end of a pre-defined range, e.g., 1-10, where "1" represents no correlation with intellectual property and "10" represents maximum correlation with intellectual property. In addition, in one or more embodiments, multipliers may include data describing the next three (3) or more achievements will improve the intellectual property capital, market influence, and the like of the user. In the context of a competitor's intellectual property portfolio, this may mean displaying indicia on display device 216 relating to expanding the user's company's influence further only if they successfully complete certain identified market analysis tools, e.g., increased advertising, going to more networking events, and the like. As a result, processor 108 may perform at least an achievement plan 224 based on interface query data structure 212 and data multiplier generation 220 and/or data multiplier scoring.

Continuing reference to FIG. 2, processor 108 may generate an optimization process 224 as a function the constraint data, plurality of nodes, at least a user-input data, related high data values, and retrieved data related to the at least a user-input data. As used herein, an "optimization plan" refers to a path that a user can follow to optimize their path selection. Examples of an optimization process 224 may include encouraging the user to attend more networking events to gain helpful connections within their field, engaging in more marketing techniques to spread awareness about their products, and the like. In an embodiment, optimization process 224 may generate one or more optimization plans present in an ordered hierarchy based on relevancy to the use progression towards their identified endpoint. If the user is considering pursing multiple routes to gain intellectual capital, then optimization process 224 may consider and compute strategies based on quantitatively manipulating data describing one or more of user data 204, interface query structure 212, related high data values, retrieved data related to the at least a user-data input and the like. A person skilled in the art would recognize that any calculative and/or multiplicative procedure would be suitable upon review of the entirety of this disclosure. In a non-limiting embodiment, processor 108 may rank optimization processes based on which achievement plan can help the user achieve their goals in the shortest amount of time. In a non-limiting embodiment, optimization process may comprise generating at least an action item. As used herein, an "action item" refers to a task, step of tasks, and/or act that a user can do to help progress on their achievement plan. Action items may consist of going to networking events, engaging in additional marketing strategies, patenting more intellectual property concepts, and the like. An action item may allow the user to progress towards their achievement plan at a more efficient pace. At least an action item may consist of several action items that when taken together allows the user to progress towards their achievement plans and ultimate goals. At least an action item may be iteratively updated based on updated user data and/or user-input data.

In one or more embodiments, a machine-learning process may be used to generate one or more optimization processes relating to improving user intellectual property capital or market influence. In one or more embodiments, an optimization machine-learning model 228 may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from database 208 and/or as any database described in this disclosure or be provided by the user. In other embodiments, optimization machine-learning module may obtain a training set by querying a communicatively connected database that includes past inputs and outputs. Training data may include inputs from various types of databases, resources, and/or user inputs and outputs correlated to each of those inputs so that a machine-learning module may determine an output, such as a personal performance data output associated with or otherwise generated by strategy data generation, for an input, such as interface query data structure 212 and user data 204. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements.

Still referring to FIG. 2, in some embodiments, apparatus 100 may locate in the plurality of nodes 202 an outlier cluster 232 in relation to endpoint. In some embodiments, apparatus 100 may include at least a processor 108 and a memory communicatively connected to the at least a processor 108, the memory containing instructions configuring the at least a processor to locate in the plurality of nodes an outlier classifier.

Still referring to FIG. 2, in some embodiments, apparatus 100 may determine outlier cluster 232 as a function of impact metric 236. As used herein, an "outlier cluster" is an attribute cluster with an impact metric that differs substantially from a population average. In some embodiments, outlier classifier measures a skill, competence, or impact. In a non-limiting example, outlier cluster 228 may represent a function is more skilled at than another entity or than an average entity. In some embodiments, outlier cluster 232 may represent an attribute that is particularly important to an entity's success in a target process. In a non-limiting example, an attribute cluster representing skill with certain computer programs may be an outlier cluster if a related impact metric suggests that it plays a much more important role in an entity's success than other entities with attribute clusters representing skill with those computer programs. In another non-limiting example, an attribute cluster representing fluency in a certain language may be an outlier cluster relative to a population of entities in the same industry if the entity does substantial work in a geography that primarily speaks that language, but the others do not. As used herein, an "impact metric" is a measure of the degree to which an attribute cluster supports a target process. In some embodiments, processor 108 may determine impact metric 236 using an impact metric machine learning model 240. In some embodiments, impact metric machine learning model 240 may be trained on data sets including historical attribute clusters, and historical target processes, associated with ratings of the degree to which historical attribute clusters support the historical target processes. Such ratings may be obtained, in a non-limiting example, from average ratings of experts as to the degree to which these historical attribute clusters supported these historical target processes. Impact metric machine learning model 240 may accept as inputs plurality of nodes, constraints, and target process 244 and may output impact metric 236.

Still referring to FIG. 2, in some embodiments, processor 108 may determine outlier cluster 232 as a function of impact metric 236. In some embodiments, processor 104 may use impact metric machine learning model 240 to determine an impact metric associated with a plurality of nodes. In some embodiments, processor 108 may determine outlier cluster 232 to include plurality of nodes 202 associated with impact metric 236 that indicates that the plurality of nodes 202 provides substantial support to optimization process 224 and/or constraints put in place. In some embodiments, processor 108 may determine outlier cluster 232 to include plurality of nodes 202 associated with impact metric 232 that indicates that the plurality of nodes and/or constraints 204 supports target process 236 more than other plurality of nodes 202. In some embodiments, processor 108 may determine outlier cluster 232 to include pluralities of nodes, constraints, and the like associated with impact metric 236 that indicates that the plurality of nodes 202 supports target process 236 more than an plurality of nodes 202 representing the population average would. In non-limiting examples, population averages may include population averages among all user data, or a subset of user data, such as all user data in a particular industry. In a non-limiting example, processor 108 may use processes described herein, with external user data, such as entity data associated with a third party, in order to determine plurality of nodes associated with a different user data, and processor may compare plurality of nodes 202 or impact metrics with those of different markets to determine which plurality of nodes 202 are outlier clusters 228. Additional disclosure related outlier clustering may be found in U.S. patent application Ser. No. 18/141,296, filed on Apr. 28, 2023, and entitled "SYSTEMS AND METHODS FOR DATA STRUCTURE GENERATION BASED ON OUTLIER CLUSTERING", the entirety of which is incorporated herein by reference.

Still referring to FIG. 2, in some embodiments, system 100 may receive target process from a target process source. In some embodiments, a target process data source may include a computing device such as a smartphone, tablet, or computer, that accepts user input data.

Still referring to FIG. 2, in some embodiments, locating in plurality of nodes 202 outlier cluster 232 includes identifying target process 244, inputting target process 244 into impact metric machine learning model 240, inputting plurality of nodes 202 into impact metric machine learning model 240, receiving impact metric 236 from impact metric machine learning model 240, and determining outlier cluster 232 as a function of impact metric 236. In some embodiments, locating in plurality of nodes 202 outlier cluster 232 includes identifying external plurality of nodes, inputting the external user data clusters into impact metric machine learning model 240, inputting target process 244 into impact metric machine learning model 240, receiving an external impact metric from the impact metric machine learning model 240, and determining outlier cluster 232 as a function of impact metric 236 and the external impact metric. In some embodiments, impact metric 236 indicates higher aptitude in the attribute cluster than the external impact metric.

Still referring to FIG. 2, in some embodiments, apparatus 100 may determine an outlier process 248 as a function of an outlier cluster 232. In some embodiments, system 100 may include at least a processor 108 and a memory communicatively connected to the at least processor 108, the memory containing instructions configuring the at least processor 108 to determine an outlier process 248 as a function of an outlier cluster 232.

Still referring to FIG. 2, in some embodiments, system 100 may determine outlier process 248 using outlier process machine learning model 262. In some embodiments, outlier process machine learning model 262 may be trained using historical plurality of nodes associated with historical processes which the user data associated with the historical data that the plurality of nodes were proficient in, constraints, historical constraints, and the like. In some embodiments, historical constraints may be determined using processes for determining constraints described herein, applied to historical user data such as public statements by an entity, financial reports by an entity, and social media posts by an entity or its employees. In some embodiments, outlier process machine learning model 244 may accept as an input outlier cluster 228 and may output outlier process 248.

Still referring to FIG. 2, in some embodiments, processor 108 may determine outlier process 248 without use of outlier process machine learning model 262. In some embodiments, processor 104 may determine outlier process 248 as a function of predetermined associations between constraints and the plurality of nodes. As a non-limiting example, processor 108 may lookup one or more processes that are associated with outlier cluster 232 from a list of associations between attribute clusters and processes, and processor 104 may determine these one or more associated processes to be outlier processes. As another non-limiting example, processor 108 may determine outlier process 248 as a function of constraints in outlier cluster 232. As a non-limiting example, processor 108 may reference a list of associations between constraint data 266 and plurality of nodes 202, and processor may add the association values for a process for each constraint data 266 within outlier cluster 232. In this example, processor 108 may determine outlier process 248 to be the process with the highest association value sum. In some embodiments, such a calculation may use terms weighted by the degree of association between constraint data 266 and plurality of nodes 202.

Still referring to FIG. 2, Still referring to FIG. 2, in some embodiments, system 100 may determine a visual element data structure as a function of outlier process 248. In some embodiments, system 100 may include at least a processor 108 and memory communicatively connected to the at least processor 108, the memory containing instructions configuring the at least processor 108 to determine a visual element data structure as a function of the outlier process 248.

Still referring to FIG. 2, in some embodiments, a visual element data structure may include a visual element 260. In some embodiments, a visual element data structure may include a rule for displaying visual element 260. In some embodiments, a visual element data structure may be determined as a function of an outlier process 248. In some embodiments, a visual element data structure may be determined as a function of an item from the list consisting of plurality of nodes 202, constraint data 266, user datum 204, target process 244, impact metric 236, outlier cluster 232, and outlier process 248. In a non-limiting example, a visual element data structure may be generated such that visual element 260 describing or highlighting outlier process 248 is displayed to a user. In another non-limiting example, a visual element data structure may be generated such that constraint data 266 or plurality of nodes 202 is compared to a constraint or other plurality of nodes. In a non-limiting example, a visual element data structure may be generated such that target process 244 is compared to outlier process 248. In a non-limiting example, a visual element data structure may be generated such that a plurality of nodes 202 and their constraint data 266 are displayed to a user. Visual element 260 may include, for example, one or more elements of text, images, shapes, charts, particle effects, interactable features, and the like. In a non-limiting example, visual element 260 may include the name of an entity in text, and outlier process 248, described in text. In a non-limiting example, visual element 260 may include text describing a plurality of nodes 202, text describing outlier cluster 232, and a particle effect around the text describing outlier cluster 232. In a non-limiting example, visual element 260 may include images depicting a plurality of user data, and text describing constraints associated with the user data.

Still referring to FIG. 2, a visual element data structure may include rules governing if or when visual element 260 is displayed. In a non-limiting example, a visual element data structure may include a rule causing a visual element 260 describing outlier cluster 232 to be displayed when a user selects outlier cluster 232 using a GUI.

Still referring to FIG. 2, a visual element data structure may include rules for presenting more than one visual element 260, or more than one visual element 260 at a time. In an embodiment, about 1, 2, 3, 4, 6, 10, 20, or 60 visual elements are displayed simultaneously.

Still referring to FIG. 2, a visual element data structure rule may apply to a single visual element 260 or datum, or to more than one visual element 260 or datum. A visual element data structure may categorize data into one or more categories and may apply a rule to all data in a category, to all data in an intersection of categories, or all data in a subsection of a category (such as all data in a first category and not in a second category). In a non-limiting example, a visual element data structure may categorize constraint data 266 according to whether they are members of a particular plurality of nodes 202 or not. A visual element data structure may rank data or assign numerical values to them. In a non-limiting example, a visual element data structure may rank plurality of nodes and constraints by their impact metrics 236. A numerical value may, for example, measure the degree to which a first datum is associated with a category or with a second datum. In a non-limiting example, a numerical value may measure the degree to which constraint data 266 is associated with a particular plurality of nodes 202. A visual element data structure may apply rules based on a comparison between a ranking or numerical value and a threshold. In a non-limiting example, a visual element data structure may apply a highlighting effect to all constraint data 266 associated with a particular plurality of nodes 202. Rankings, numerical values, categories, and the like may be used to set visual element data structure rules. Similarly, rankings, numerical values, categories, and the like may be applied to visual elements, and visual elements may be applied based on them. In a non-limiting example, user may select plurality of nodes 202 and visual element 262 highlighting all constraint data 266 associated with the plurality of nodes 202 to be displayed.

Still referring to FIG. 2, in some embodiments, visual element 260 may be interacted with. For example, visual element 260 may include an interface, such as a button or menu. In some embodiments, visual element 260 may be interacted with using a user device such as a smartphone.

Still referring to FIG. 2, in some embodiments, system 100 may determine visual element 260. In some embodiments, system 100 may include at least a processor 108 and a memory communicatively connected to the at least processor 108, the memory containing instructions configuring the at least processor 108 to determine visual element 260.

Continuing to refer to FIG. 2, in one or more embodiments, visual element 260 may include display device that may be communicatively connected to computing device 104. Display device may display the optimization process, outlier process and the like to the user through a user interface. Display device may be remote to computing device or integrated into computing device 104. Communication between computing device 104 and display component may be wired or wireless. In one or more embodiments, display device may be configured to display user data 204, interface query data structure 212, interface query data structure recommendation 216, data multiplier generation 220, data multiplier scoring, data describing database, and/or the like. Display device may include a graphic user interface (GUI) that a user may use to navigate through presented data or information by computing device 104. In one or more embodiments, a GUI may include a plurality of lines, images, symbols, and the like to show information and/or data. In addition, the GUI may be configured to provide an articulated graphical display on display device, the articulated graphical display including multiple regions, each region providing one or more instances the point of interaction between the user and the remote display device. In non-limiting embodiments, display device may include a smartphone, tablet, laptop, desktop, monitor, tablet, touchscreen, head-up display (HUD), and the like. In one or more embodiments, display device may include a screen such as a liquid crystal display (LCD) various other types of displays or monitors, as previously mentioned in this disclosure. In one or more embodiments, user may view information and/or data displayed on display device in real time. In one or more embodiments, display component may be configured to display received or determined information, which may be toggled through using, for example, an input device of display component or computing device 104. Display device may include electronic components utilized to display image data or information, such as a video, GUI, photo, and the like.

Continuing to refer to FIG. 2, processor 108 may be configured to identify at least an improvement datum as a function of the optimization process. Improvement datum refers to data that indicates improvements that have occurred as a result of the optimization process. "Improvement datum" for the purposes of this disclosure is data relating to the improvement of a user over a given period of time. Improvement datum 264 may be determined by comparing current data from user data 204 and previously entered user data from current data. Improvement datum 264 may indicate or contain data that a user has improved over a particular period of time based on the current data and previously entered user data. Improvement datum 264 may also indicate that a goal sought in the current iteration is different than a goal sought in a previous iteration. Improvement datum 264 may also be determined based on previous score data generated or received from a previous iteration of the processing, and achievement plan 224 generated from the current iteration of the processing. Improvement datum 264 may include data signifying to a user that the user has improved on their goals or their market influence since a previous iteration. Improvement datum 264 may further include data signifying that a user has maintained their goals or has regressed since the previous iteration. Improvement datum 264 may be generated by determining a difference between previous score data and achievement plan 224 and outputting improvement datum 264 as a function of the difference. Improvement datum 264 may be generated using a lookup table wherein each difference is correlated to data within the lookup table. A "lookup table" for the purposes of this disclosure is an array of predetermined values wherein each value may be looked up using a key corresponding to that specific value. For example, a value of −2 as described above may contain data within a lookup table of improvement datum 264 that is correlated to a drop in one's improvement. The lookup table may be retrieved from a database 208 and/or generated by a user. In some embodiments, at least a processor 108 may 'lookup' a given difference to one or more lists improvement data. In an embodiment, an improvement datum may comprise comparing the at least a user-input data to a pre-defined threshold. As used herein, a "pred-defined threshold" refers to a to a range of values or points that indicate a user has successfully improved. In a non-limiting embodiment, the concept of an improvement datum involves a comparative analysis where user-input data is measured against a pre-defined threshold to assess improvement. The pre-defined threshold in this context is a range of values or specific points that signify successful improvement by the user. Essentially, it acts as a benchmark or target that the user aims to reach or exceed. For instance, in an intellectual property capital setting, a patent portfolio might be input into the system and compared against pre-defined thresholds of companies or industries that have a large market impact; surpassing or meeting these thresholds would indicate an improvement in the user companies market impact. In another business context, sales figures or customer satisfaction ratings might be the user-input data evaluated against set performance goals. The pre-defined threshold is established based on desired outcomes, historical data, or industry standards, and serves as a critical marker for quantifying and qualifying success. It allows for an objective assessment of whether and to what extent the user or system has improved by providing a clear, measurable point of comparison. This process of comparing user-input data to a pre-defined threshold enables targeted improvements, efficient monitoring, and actionable feedback, driving continuous advancement and achievement of specific goals. In a non-limiting embodiment, the pre-defined threshold may comprise data associated with the optimization process 224. Determining a pre-defined threshold may incorporate data associated with optimization process 224 by configuring the pre-defined threshold based on the action items associated with the optimization process and their effectiveness in allowing the user to achieve their endpoint.

With continued reference to FIG. 2, processor 108 may be configured to generate a goal report 268 as a function of the at least an improvement datum 264. As used herein, a "goal report" is a data structure representing an overview of the optimization process, at least an improvement datum, and user-input data, and the pre-defined threshold that may be used for decision-making associated with the implementation of the optimization process for the user. Processor 108 may be configured to generate the goal report 268 using a goal report machine learning model. Goal report machine learning model may be consistent with any machine learning models discussed throughout this disclosure. Goal report training data may consist of optimization process, at least improvement datum, and user-input data as inputs and output a goal report. Goal report training data may consist of historical versions of goal reports. Goal report machine learning model may be iteratively updated using new goal report training data. Goal report machine learning model may use previous iterations of outputs as inputs and re-run the goal report machine learning model based on this information.

Figure 3:
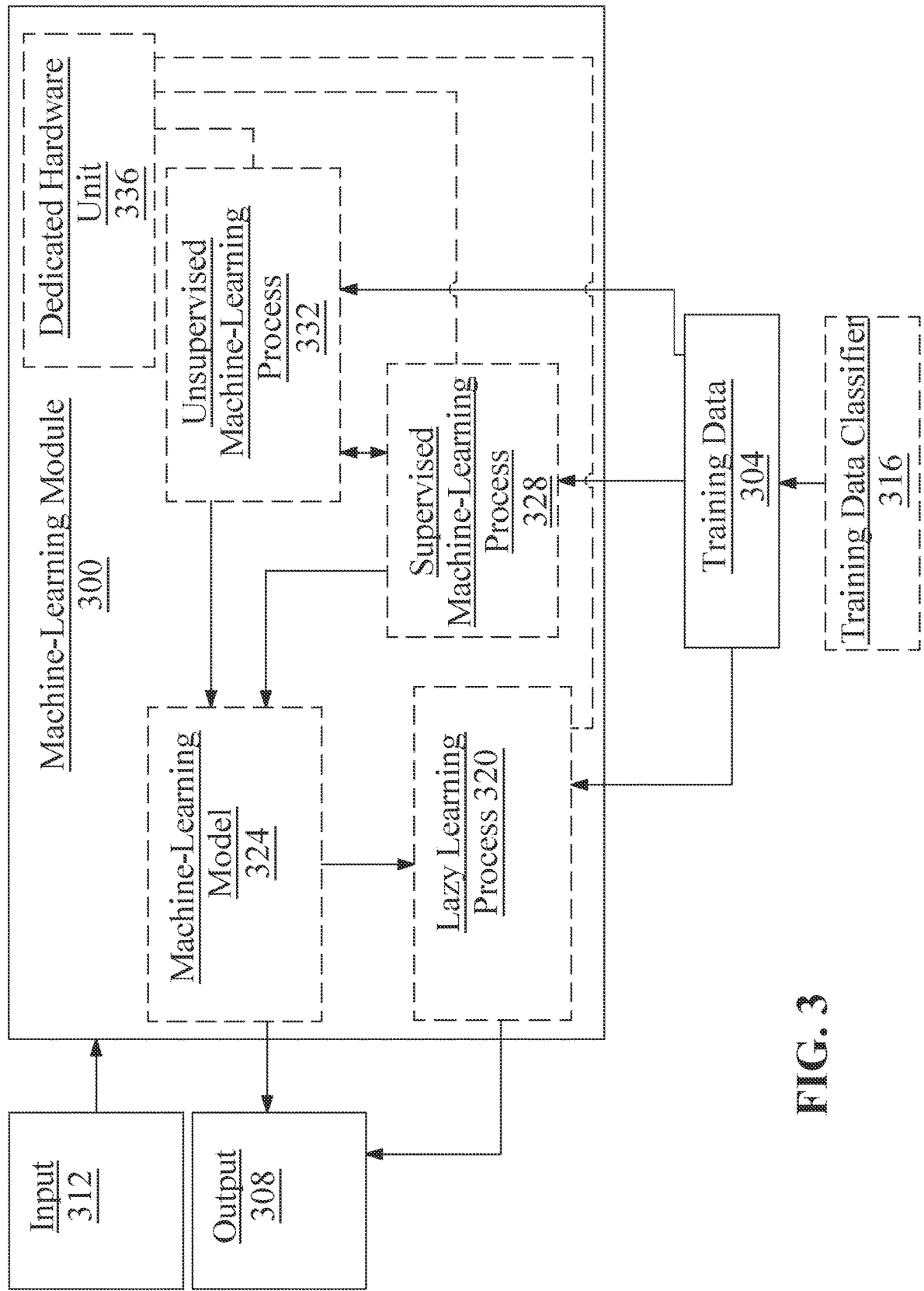
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier may classify elements of training data to test sets. In another nonlimiting example, Still referring to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [6, 10, 16] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitation may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 266 pixels, however a desired number of pixels may be 128. Processor may down-sample the high pixel count image to convert the 266 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $26^{th}$ percentile value and the $60^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure. As used in this disclosure "matrix" is a rectangular array or table of numbers, symbols, expressions, vectors, and/or representations arranged in rows and columns. Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix $V^T$ represents right singular vectors consisting of an orthogonal matrix of n rows and n columns according to the function:

$$A_{m \times n} = U_{m \times m} S_{m \times n} V_{n \times n}^T$$

singular value decomposition function may find eigenvalues and eigenvectors of $AA^T$ and $A^TA$. The eigenvectors of $A^TA$ may include the columns of $V^T$, wherein the eigenvectors of $AA^T$ may include the columns of U. The singular values in S may be determined as a function of the square roots of eigenvalues $AA^T$ or $A^TA$, wherein the singular values are the diagonal entries of the S matrix and are arranged in descending order. Singular value decomposition may be performed such that a generalized inverse of a non-full rank matrix may be generated.

Figure 4:
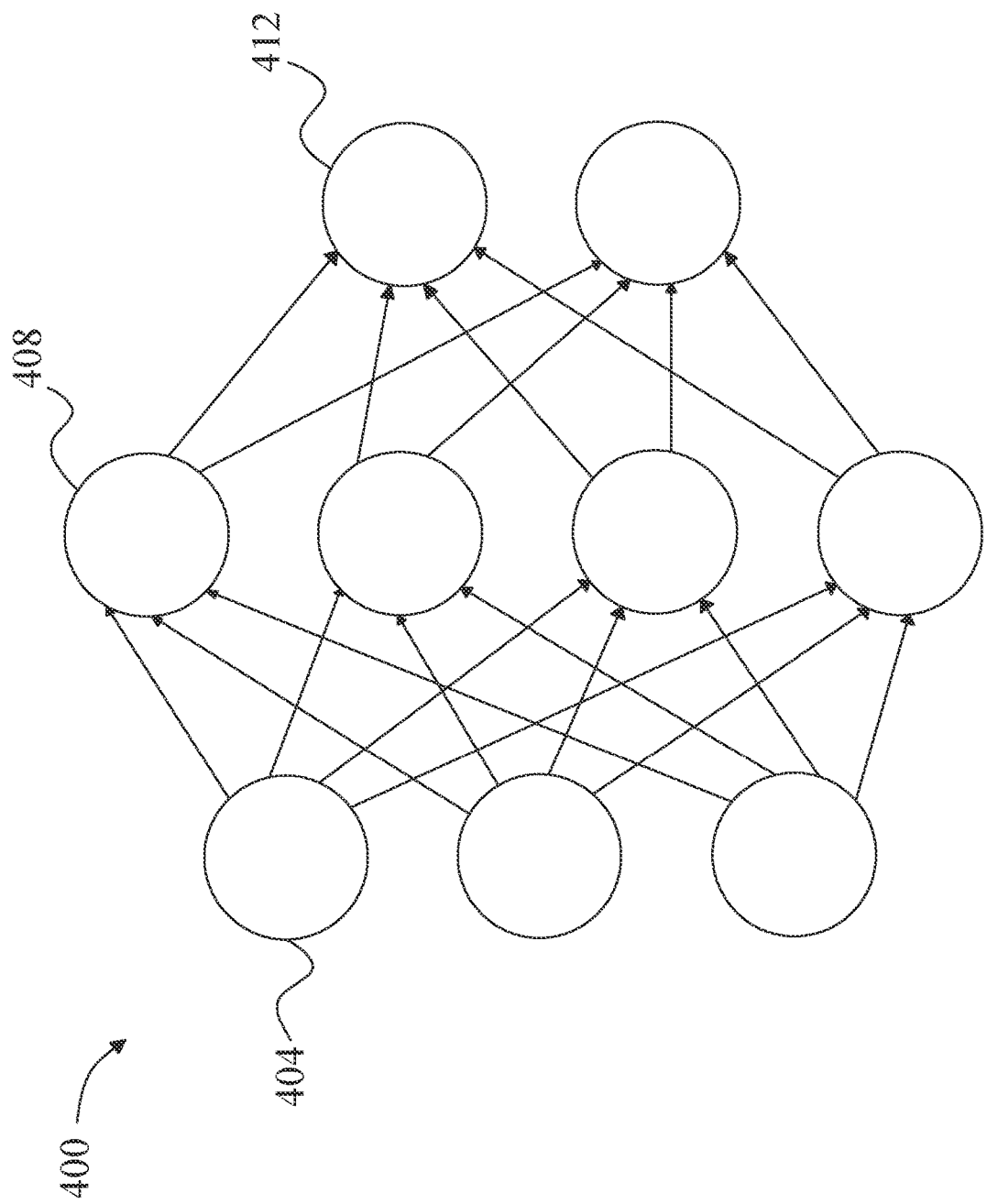
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
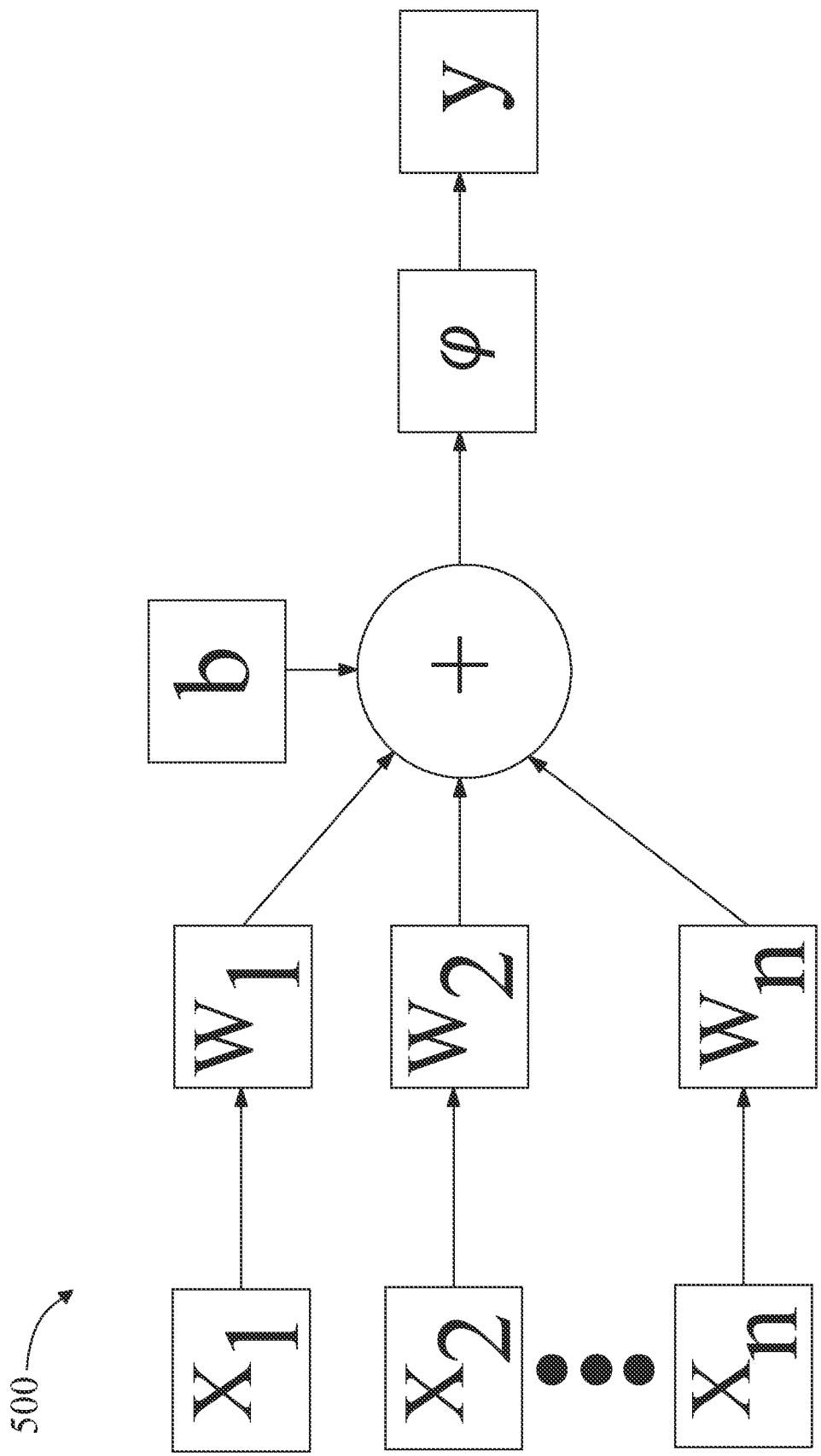
FIG. 5 is a block diagram of an exemplary embodiment of a node.

Referring now to FIG. 5, an exemplary embodiment of a node 500 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some $a$, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^{x_i}}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}(x + bx^r)\right)\right)$$

for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
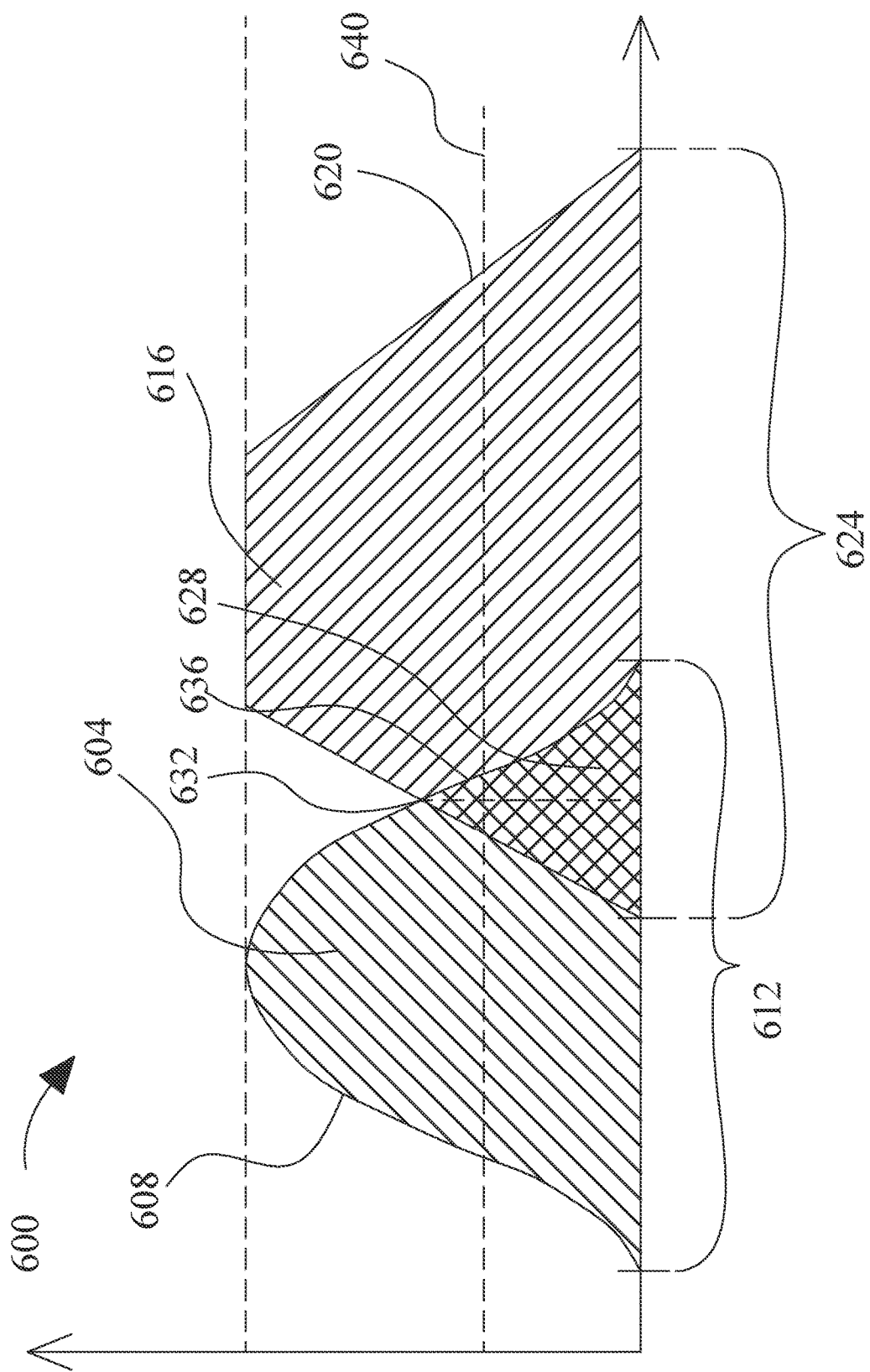
FIG. 6 is a graph illustrating an exemplary relationship between fuzzy sets.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, image data, user data, and a predetermined class, such as without limitation of recommendation. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or image data, user data, verifier location, network latency, and a predetermined class, such as without limitation recommendation goal class, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify image data, user data, or any other data described herein. For instance, if a user has a fuzzy set matching image data, user data, at least a fuzzy set by having a degree of overlap exceeding a threshold, processor 108 may classify, image data, user data, at least a user data as belonging to the achievable goal class. Where multiple fuzzy matches are performed, degrees of match for each respective fuzzy set may be computed and aggregated through, for instance, addition, averaging, or the like, to determine an overall degree of match.

Still referring to FIG. 6, in an embodiment, an image data, user data, or any other data may be compared to multiple goal class fuzzy sets. For instance, image data or user data may be represented by a fuzzy set that is compared to each of the multiple goal class fuzzy sets; and a degree of overlap exceeding a threshold between the image data, user data fuzzy set and any of the multiple goal class fuzzy sets may cause processor 108 to classify the image data or user data as belonging to achievable categorization. For instance, in one embodiment there may be two goal class fuzzy sets, representing respectively entity-specific categorization and a non-entity specific categorization. First entity-specific goal class may have a first fuzzy set; Second entity-specific goal class may have a second fuzzy set; and image data or user data may have an image data, or user data set. Processor 108, for example, may compare an image data or user data fuzzy set with each of goal class fuzzy set and in goal class fuzzy set, as described above, and classify image data, or user data to either, both, or neither of goal class nor in goal class. Machine-learning methods as described throughout may, in a non-limiting example, generate coefficients used in fuzzy set equations as described above, such as without limitation x, c, and σ of a Gaussian set as described above, as outputs of machine-learning methods. Likewise, image data, or user data may be used indirectly to determine a fuzzy set, as image data, or user data fuzzy set may be derived from outputs of one or more machine-learning models that take the image data, or user data directly or indirectly as inputs.

Still referring to FIG. 6, a computing device may use a logic comparison program, such as, but not limited to, a fuzzy logic model to determine a recommendation response. An recommendation response may include, but is not limited to, very unlikely, unlikely, likely, and very likely, and the like; each such recommendation response may be represented as a value for a linguistic variable representing recommendation response or in other words a fuzzy set as described above that corresponds to a degree of matching as calculated using any statistical, machine-learning, or other method that may occur to a person skilled in the art upon reviewing the entirety of this disclosure. In other words, a given element of image data, or user data may have a first non-zero value for membership in a first linguistic variable value such as "very likely" and a second non-zero value for membership in a second linguistic variable value such as "very unlikely" In some embodiments, determining a goal class may include using a linear regression model. A linear regression model may include a machine learning model. A linear regression model may be configured to map data of image data, device identification, verifier location, network latency, such as degree of . . . to one or more recommendation parameters. A linear regression model may be trained using a machine learning process. A linear regression model may map statistics such as, but not limited to, quality of image data, or user data. In some embodiments, determining a recommendation of image data, or user data may include using a recommendation classification model. A recommendation classification model may be configured to input collected data and cluster data to a centroid based on, but not limited to, frequency of appearance, linguistic indicators of quality, and the like. Centroids may include scores assigned to them such that quality of image data, or user data may each be assigned a score. In some embodiments recommendation classification model may include a K-means clustering model. In some embodiments, recommendation classification model may include a particle swarm optimization model. In some embodiments, determining the recommendation of an image data, or user data may include using a fuzzy inference engine. A fuzzy inference engine may be configured to map one or more image data or user data elements using fuzzy logic. In some embodiments, image data, or user data may be arranged by a logic comparison program into recommendation arrangement. An "recommendation arrangement" as used in this disclosure is any grouping of objects and/or data based on skill level and/or output score. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given degree of matching level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to image data, device identification, verifier location, network latency, such as a degree of matching of an element, while a second membership function may indicate a degree of in recommendation of a subject thereof, or another measurable value pertaining to image data or user data. Continuing the example, an output linguistic variable may represent, without limitation, a score value. An inference engine may combine rules, such as: "if image is likely this verifier, device is highly likely the verifier's device, location is likely correct, and network latency is likely correct, then verifier is highly likely to be identified"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T (a, b)=T (b, a)), monotonicity: (T (a, b)≤T (c, d) if a≤c and b≤d), (associativity: T (a, T (b, c))=T (T (a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(a, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 6, image data or user data to be used may be selected by user selection, and/or by selection of a distribution of output scores, such as 100% very likely, 100% very unlikely, or the like. Each goal class may be selected using an additional function as described above.

Figure 7:
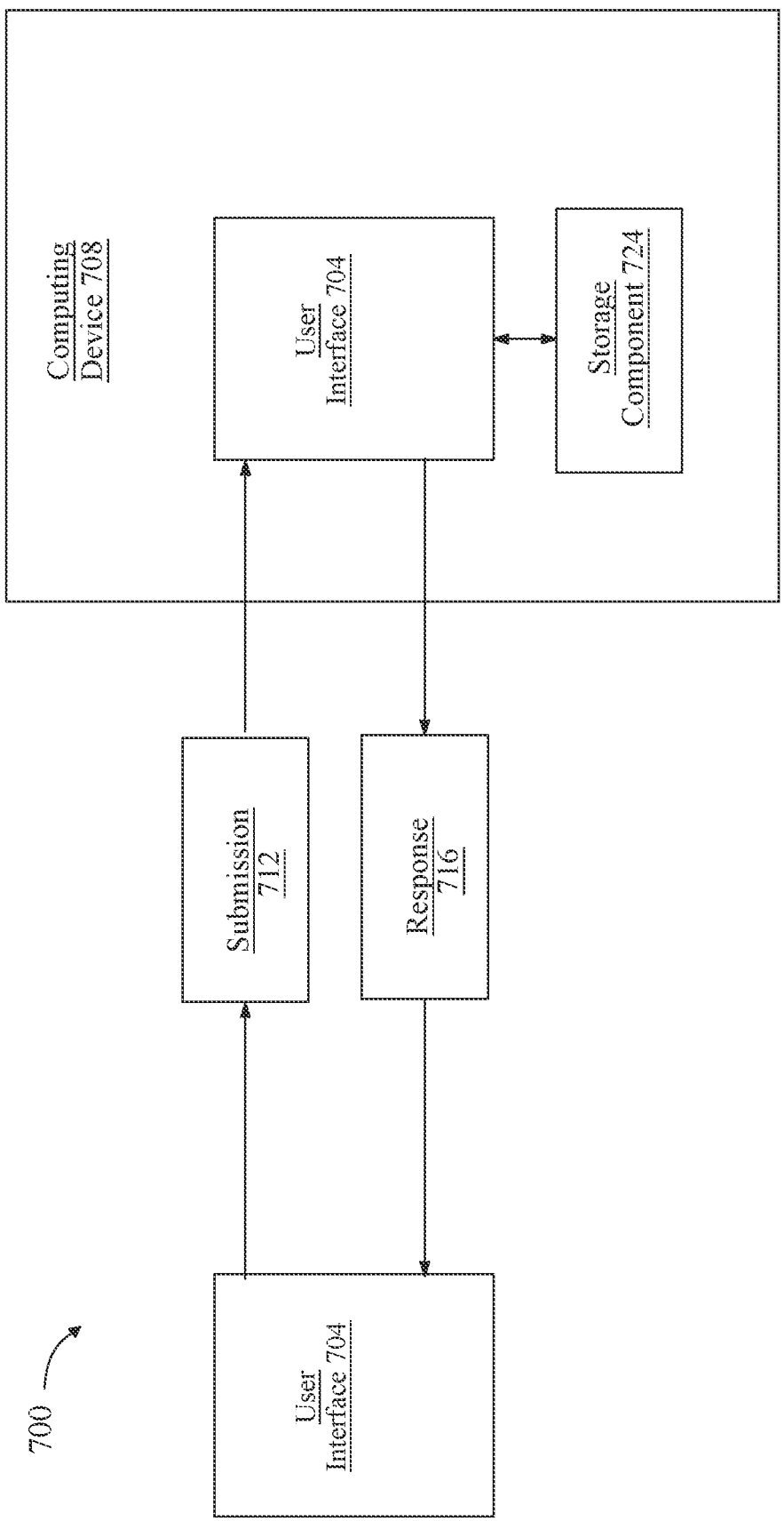
FIG. 7 is a block diagram of a chatbot system.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 717, from the chatbot to the user interface 704. In many cases, one or both of submission 712 and response 717 are text-based communication. Alternatively or additionally, in some cases, one or both of submission 712 and response 717 are audio-based communication.

Continuing in reference to FIG. 7, a submission 712 once received by computing device 708 operating a chatbot, may be processed by a processor 720. In some embodiments, processor 720 processes a submission 712 using one or more of keyword recognition, pattern matching, and natural language processing. In some embodiments, processor employs real-time learning with evolutionary algorithms. In some cases, processor 720 may retrieve a pre-prepared response from at least a storage component 724, based upon submission 712. Alternatively or additionally, in some embodiments, processor 720 communicates a response 717 without first receiving a submission 712, thereby initiating conversation. In some cases, processor 720 communicates an inquiry to user interface 704; and the processor is configured to process an answer to the inquiry in a following submission 712 from the user interface 704. In some cases, an answer to an inquiry present within a submission 712 from a user interface 704 may be used by computing device 708 as an input to another function.

Figure 8:
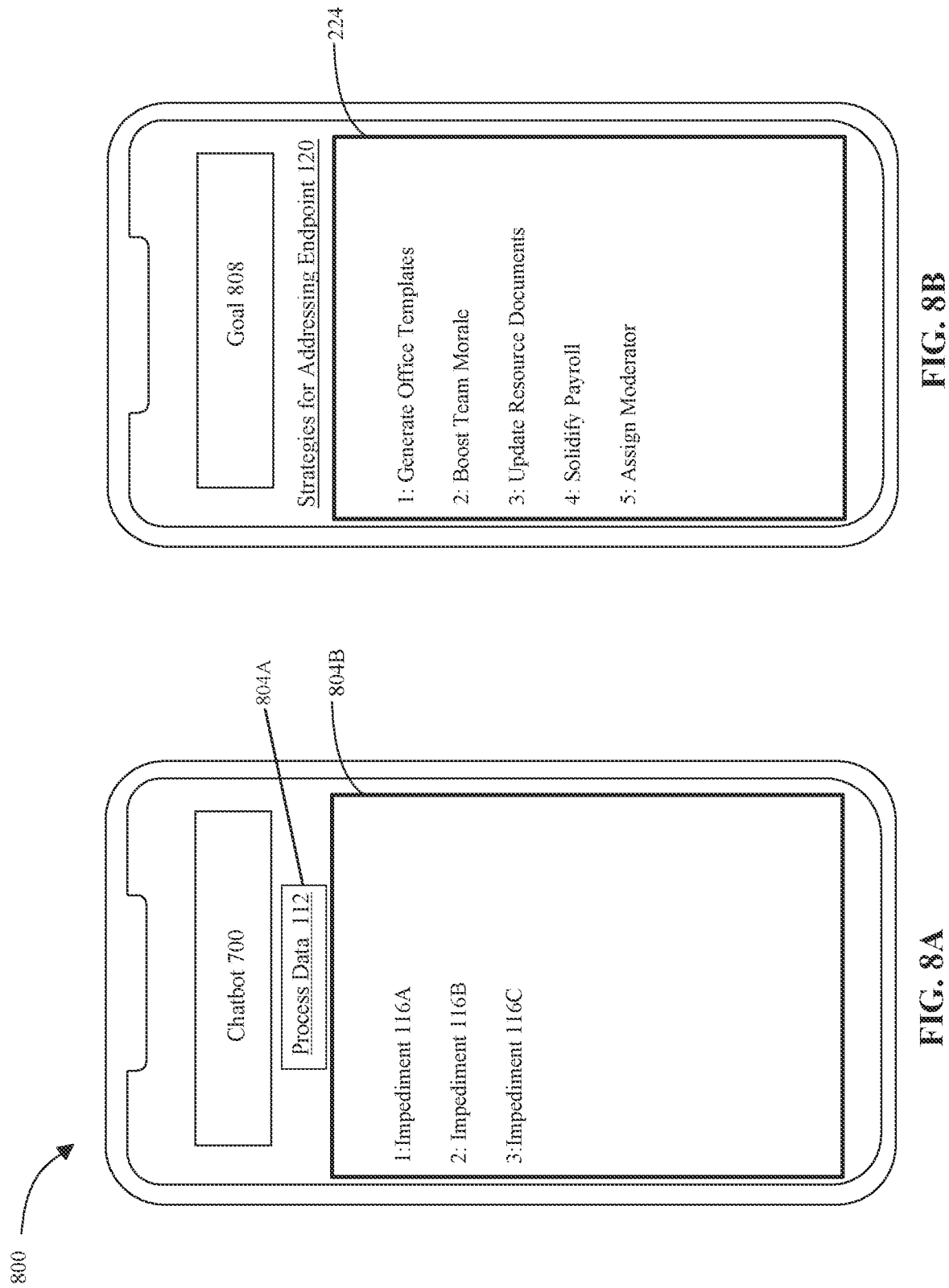
FIGS. 8A-B are diagrams of an exemplary embodiment of a user interface.

Referring now to FIGS. 8A-B, exemplary embodiments of a user interface 800 is illustrated. User interface 800 may include chatbot 700 configured to receive process data 112 in one input field 804A and a plurality of impediments (A-C) 116 in a separate input field 804B. A "input field," as used herein, is a user interface element that allows users to input data. Chatbot 700 may list prompts requesting a user to input such related information into the appropriate input field. User interface 800 may display a goal 808 received from process data 112. User interface 800 may display optimization process 224 as a list of steps for addressing endpoint 120 in relation to reaching a goal 808 based on an visual element data structure as described in FIG. 2.

Figure 9:
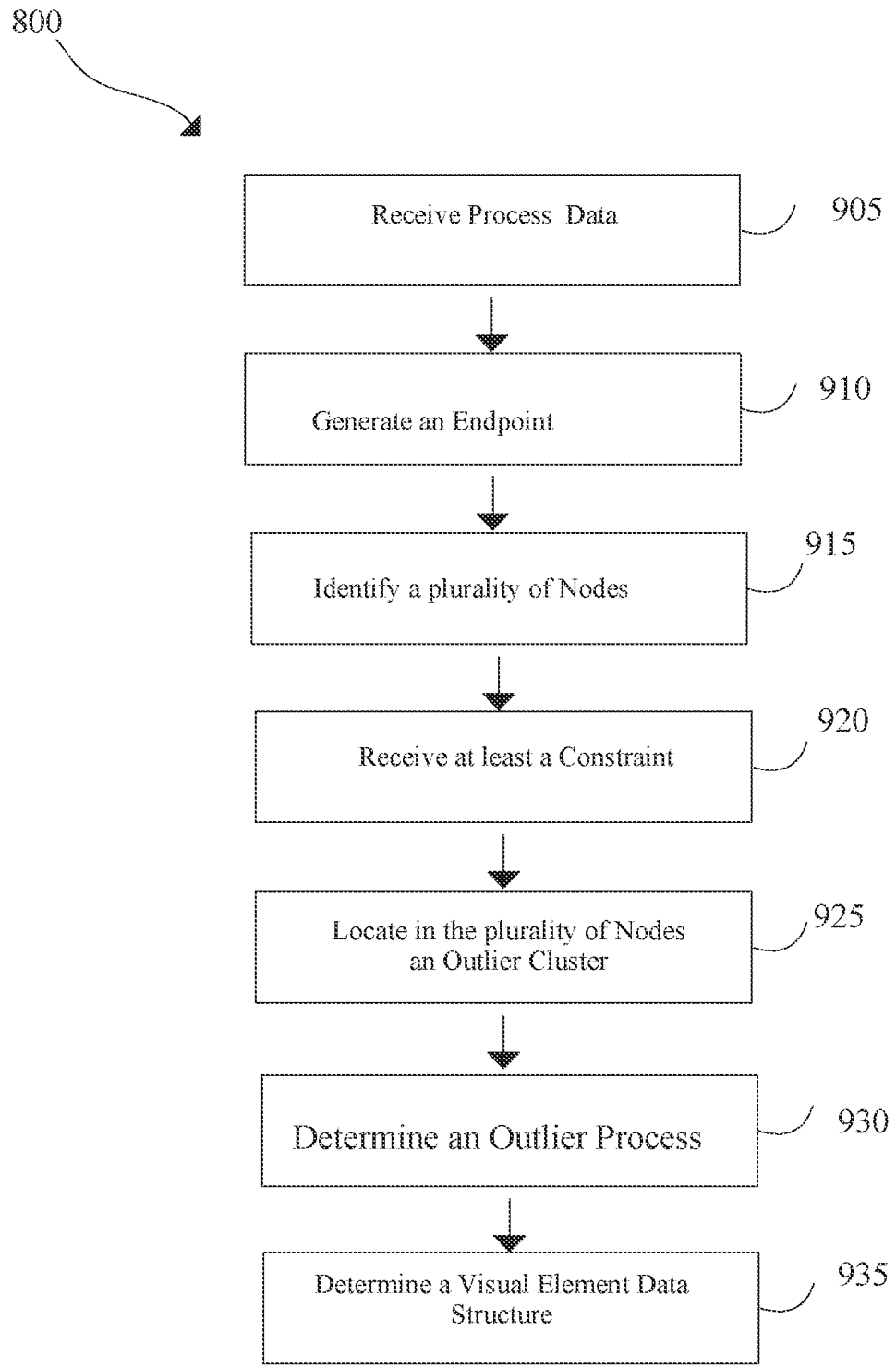
FIG. 9 is a flow diagram illustrating an exemplary embodiment of a method for varying optimization solutions using constraints based on an endpoint.

Referring now to FIG. 9, an exemplary flow chart of a method 900 for varying optimization solutions using constraints based on an endpoint. At step 905, method 900 includes receiving process data including a plurality of impediments. This may be implemented as disclosed and with reference to FIGS. 1-8. At step 910, method 900 includes generating an endpoint using a module configured to analyze the plurality of impediments by extracting a feature from each impediment of the plurality of impediments, classify a plurality of impediments using the extracted features to a plurality of identifiers, rank the plurality of identifiers based on severity score, and output the endpoint based on an identifier severity score. This may be implemented as disclosed and with reference to FIGS. 1-8. At step 915, method 900 includes identifying a plurality of nodes. This may be implemented as disclosed and with reference to FIGS. 1-8. At step 920, method 900 includes receiving at least a constraint. This may be implemented as disclosed and with reference to FIGS. 1-8. At step 925, method 900 includes locating in the plurality of nodes an outlier cluster based on the endpoint. This may be implemented as disclosed and with reference to FIGS. 1-8. At step 930, method 900 includes determining an outlier process as a function of the outlier cluster. This may be implemented as disclosed and with reference to FIGS. 1-8. At step 935, method 900 includes determining a visual element data structure as a function of the outlier process. This may be implemented as disclosed and with reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
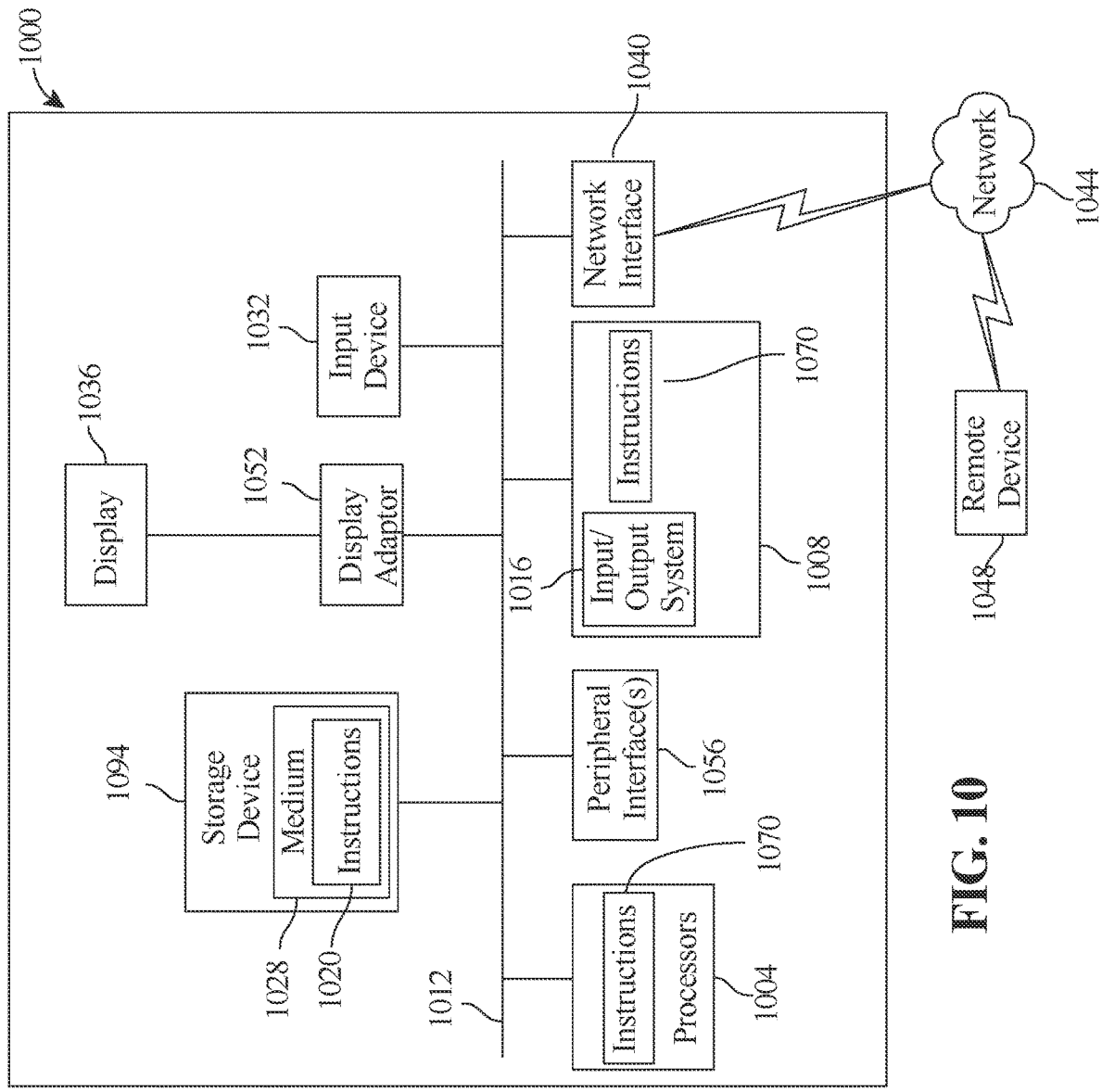
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 13104 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1062 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1062 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1066. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for varying optimization solutions using constraints based on an endpoint, the system comprising:
   at least a processor;
   a memory communicatively connected to the at least a processor, the memory containing instructions configuring the processor to:
   receive process data comprising a plurality of impediments;
   generate an endpoint using a module configured to:
   analyze the plurality of impediments by extracting a feature from each impediment of the plurality of impediments;
   classify a plurality of impediments using the extracted features to a plurality of identifiers;
   rank the plurality of identifiers based on an identifier severity score;
   output the endpoint based on the identifier severity score;
   identify a plurality of nodes;
   receive at least a constraint;
   locate, in the plurality of nodes, an outlier cluster based on the endpoint, wherein locating the outlier cluster comprises:
   identifying a target process;
   inputting the target process and the plurality of nodes into an impact metric machine learning model;
   receiving an impact metric from the impact metric machine learning model; and
   determining the outlier cluster as a function of the impact metric;
   determine an outlier process as a function of the outlier cluster; and
   determine a visual element data structure as a function of the outlier process.

2. The system of claim 1, wherein the module comprises a language processing model configured to identify a plurality of keywords from the plurality of impediments to output the plurality of features.

3. The system of claim 1, wherein the module comprises a feature classifier configured to classify the plurality of impediments to the plurality of identifiers.

4. The system of claim 1, wherein the module comprises a scoring machine learning model configured:
   to receive the plurality of identifiers as an input; and
   perform a scoring function to output a plurality of severity scores, wherein the scoring machine learning model is trained with datasets including weights associated with a plurality of features and identifiers.

5. The system of claim 1, wherein the at least a constraint comprises an interface query data structure wherein the interface query data structure is at least partially based on data describing attributes of a user that is retrieved from a database including categorical information correlated to a historical range of data.

6. The system of claim 1, wherein the impact metric indicates the degree to which the plurality of nodes supports the target process.

7. The system of claim 1, wherein determining the outlier process as a function of the outlier cluster comprises:
   inputting an outlier cluster in an outlier process machine learning model;
   receiving an outlier process from the outlier machine learning model.

8. The system of claim 1, wherein the memory contains instructions configuring the at least a processor to:

determine a visual element as a function of the visual element data structure; and configure a user device to display the visual element to the user.

9. The system of claim 8, wherein the visual element is configured to display the input field to the user by a Graphical User Interface (GUI), wherein the GUI is a point of interaction between the user and the remote display device.

10. A method for varying optimization solutions using constraints based on an endpoint, the method comprising:

receiving, by a computing device, process data comprising a plurality of impediments;

generating, by the computing device, an endpoint using a module configured to:

analyze the plurality of impediments by extracting a feature from each impediment of the plurality of impediments;

classify a plurality of impediments using the extracted features to a plurality of identifiers;

rank the plurality of identifiers based on an identifier severity score;

output the endpoint based on the identifier severity score;

identifying, by the computing device, a plurality of nodes;

receiving, by the computing device, at least a constraint;

locating, by the computing device, in the plurality of nodes an outlier cluster based on the endpoint, wherein locating the outlier cluster comprises:

identifying a target process;

inputting the target process and the plurality of nodes into an impact metric machine learning model;

receiving an impact metric from the impact metric machine learning model; and determining the outlier cluster as a function of the impact metric;

determining, by the computing device, an outlier process as a function of the outlier cluster; and determining, by the computing device, a visual element data structure as a function of the outlier process.

11. The method of claim 10, further comprising identifying, using a language processing model, to identify a plurality of keywords from the plurality of impediments to output the plurality of features.

12. The method of claim 10, further comprising, using a feature classifier, to classify the plurality of impediments to the plurality of identifiers.

13. The method of claim 10, further comprising:

receiving, using a scoring machine learning model, the plurality of identifiers as an input; and performing, using the scoring machine learning model, a scoring function to output a plurality of severity scores, wherein the scoring machine learning model is trained with datasets including weights associated with a plurality of features and identifiers.

14. The method of claim 10, wherein the at least a constraint comprises an interface query data structure wherein the interface query data structure is at least partially based on data describing attributes of a user that is retrieved from a database including categorical information correlated to a historical range of data.

15. The method of claim 10, wherein the impact metric indicates that the plurality of nodes supports the target process.

16. The method of claim 10, wherein determining the outlier process as a function of the outlier cluster comprises:

inputting an outlier cluster in an outlier process machine learning model;

receiving an outlier process from the outlier machine learning model.

17. The method of claim 10, wherein the memory contains instructions configuring the at least a processor to:

determine a visual element as a function of the visual element data structure; and configure a user device to display the visual element to the user.

18. The method of claim 17, wherein the visual element comprises a remote display device is configured to display the input field to the user by a Graphical User Interface (GUI), wherein the GUI is a point of interaction between the user and the remote display device.

* * * * *